(12) United States Patent
Viaud

(10) Patent No.: US 7,275,360 B2
(45) Date of Patent: Oct. 2, 2007

(54) LARGE ROUND BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 63 days.

(21) Appl. No.: 10/898,427

(22) Filed: Jul. 23, 2004

(65) Prior Publication Data

US 2005/0066644 A1    Mar. 31, 2005

(30) Foreign Application Priority Data

Sep. 30, 2003    (EP)    .................... 03021977

(51) Int. Cl.
*A01D 39/00*    (2006.01)
(52) U.S. Cl. ....................................... 56/341
(58) Field of Classification Search ................. 56/341, 56/343, 364, 354, 344, 345, 350; 100/88, 100/89
See application file for complete search history.

(56) References Cited

U.S. PATENT DOCUMENTS

| | | | | |
|---|---|---|---|---|
| 4,172,354 A | * | 10/1979 | Vermeer et al. .............. 56/341 |
| 4,262,478 A | * | 4/1981 | Pentith ........................ 56/341 |
| 4,345,421 A | * | 8/1982 | Schwalenberg et al. ...... 56/341 |
| 4,648,239 A | * | 3/1987 | Geiser et al. ................. 56/341 |
| 4,730,446 A | * | 3/1988 | van der Lely ................ 56/341 |
| 4,768,431 A | * | 9/1988 | Merritt et al. ................ 100/88 |
| 4,870,812 A | * | 10/1989 | Jennings et al. .............. 56/341 |
| 4,956,968 A | * | 9/1990 | Underhill ..................... 56/341 |
| 5,138,942 A | * | 8/1992 | Henderson et al. .......... 100/88 |
| 5,224,329 A | | 7/1993 | Viaud |
| 5,315,925 A | * | 5/1994 | Viaud et al. ................. 100/88 |
| 5,749,289 A | * | 5/1998 | Anderson et al. ............ 100/88 |
| 5,768,986 A | * | 6/1998 | Arnold et al. ................ 100/88 |
| 5,816,038 A | * | 10/1998 | Anderson et al. ............ 56/341 |
| 5,819,515 A | * | 10/1998 | Ratzlaff et al. ............... 56/341 |
| 5,979,153 A | * | 11/1999 | Roth ........................... 56/341 |
| 6,640,699 B2 | * | 11/2003 | Viaud ........................... 100/7 |
| 2002/0189200 A1 | | 12/2002 | Mass et al. |

FOREIGN PATENT DOCUMENTS

| | | |
|---|---|---|
| DE | 196 09 926 | 9/1997 |
| DE | 19609926 A1 * | 9/1997 |
| EP | 0 201 897 | 5/1986 |
| EP | 286776 A1 * | 10/1988 |
| WO | WO99 03322 | 1/1999 |

* cited by examiner

*Primary Examiner*—Thomas B. Will
*Assistant Examiner*—Alicia Torres

(57) ABSTRACT

A large round baler includes inner and outer runs of bale-forming belts that define a space between them in which brittle crop may fall through the gaps between adjacent belts and build up between the belt runs. In order to avoid wrapping problems a crop passage is provided at opposite sides of the space through which crop may pass from the space and gravitate to a crop feeding device which picks up crop from the ground and delivers it to the bale-forming chamber delimited by the inner run of belts.

10 Claims, 5 Drawing Sheets

LARGE ROUND BALER

FIELD OF THE INVENTION

This invention relates to a large round baler having a crop feeding device, at least one roll, at least one revolving belt, which belt delimits a periphery of a bale-forming chamber and runs over said roll, and side walls delimiting face sides of the bale-forming chamber.

BACKGROUND OF THE INVENTION

EP-A1-0 201 897 disclose a round baler with several belts which are offset from each other in a certain part of the runs by training them alternately over a pair of spaced rolls. This offset provides for gaps in the belt running plane, through which trapped crop may escape and fall onto a mat of incoming crop.

"Fundamentals of Machine operation—Hay and Forage Harvesting, page 153, print remark FMO-141B Litho in U.S.A. (D-00) of DEERE & COMPANY show a round baler, the bale-forming chamber of which is open at its face sides in an rear section. Accordingly, crop trapped between runs of belts may escape laterally, but will fall onto the ground.

WELGER round baler type 502 allows crop to exit a space between belt runs laterally, whereas this crop shall be directed to a chamber at the bottom of which a driven roll is provided, which should force the crop into the bale-forming chamber via a gap through which net may be inserted as well.

The problem from which this invention starts, is seen in the need of a device achieving the same result as the one in EP-A1-0 201 897, but reducing the space required to allow the installation of tying or wrapping systems.

SUMMARY OF THE INVENTION

According to the present invention, there is provided an improved way of removing crop material trapped between an inner, expansible section of an endless, bale-forming element arrangement, and an outer, fixed section of the endless bale-forming element arrangement.

An object of the invention is to provide a way of removing trapped crop material, in the aforementioned environment, without requiring an additional roll for supporting the bale-forming element arrangement.

A more specific object of the invention is to mount a support roll of the bale-forming element arrangement, which is located above part of a crop feeding device of the baler, so that it penetrates opposite side walls of the bale-forming chamber such as to leave a space about the roll at the region of each side wall through which trapped crop may pass and/or such that opposite sides of the bale-forming element arrangement are spaced from the side walls.

Still a more specific object of the invention is to provide a guide which directs the crop from the region adjacent the opposite ends of the roll to the crop feeding device.

By accomplishing these objects, crop is not kept in the area between the inner and outer runs of the endless bale-forming element arrangement or in the roll area, where it could create another wrapping, but it is re-circulated into the incoming crop flow. The crop feeding device could be a pick-up or a conveyor between the pick-up and the bale-forming chamber. The crop could escape at the end area of the roll, through a circular cutout of the side wall, or through a gap between the side wall edge and the bale-forming element arrangement edge. In the simplest way the guide consists of sheet metal, bent or slanted along which the crop can slide due to gravitation. However, blowers, paddle wheels, brushes and other simple conveyors may be used to move the crop along the guide and assure that crop build up does not happen. This invention is useful on variable chamber balers as on fixed chamber balers. The bale-forming element arrangement could be a belt or a slat and chain conveyor, in case the surface of which is so closed, that the exiting crop cannot escape through the openings in this type of a conveyor (hereinafter, the term "belt" will be used for the sake of brevity, with it being understood that any other endless bale-forming arrangement could be used). The roll may be smooth or profiled and may even carry spirals, slats, or the like. This solution forms a true alternative to prior art solutions, in which one or more belts are trained over offset rollers, as disclosed in EP 201 897. One bale-forming belt extending over the full width of the bale-forming chamber may be used as well as several endless bale-forming belts being trained over the roll in the same planes and side-by-side.

If the guides are each open at a lower end the crop can easily fall on top of the crop mat or on conveyors transporting said crop mat; no active feeding means are needed.

Especially if the belt forms a loop around the roll, in which loop the crop is caught, it is very helpful if the runs of the belt diverge and open the gap through which the crop can escape. It is furthermore advantageous, if a run remote from the bale-forming chamber also diverges from a side wall edge to let the crop escape.

When gaps between the belts are provided, which are so narrow, that the crop cannot fall through, the crop will move laterally to the roll end and will not get pinched and create problems.

If the roll extends beyond the side wall, also its bearing will be located outside and does not obstruct the way of the crop through the guide. If the frame supporting the roll is significantly moved away from the side wall, the roll then largely extends beyond the side wall and its bearing will be located well outside in a manner that a large path is provided for the crop to escape.

While a semi-circular cut or a cut of any other shape in the side wall may be used to let the roll extend through, it is helpful if a circular path of a diameter considerable bigger than the roll is used to let the roll extend through; other forms are possible, too. Such a cutout would leave the bale-forming chamber still closed in the remainder. Such a cutout may be arranged concentrically as well as eccentrically with respect to the roll axis. The crop could escape to the guide through the gap between the roll and the cutout.

If the roll terminates in a stub shaft, i.e. with a reduced diameter portion, more space is available for the crop to escape. Especially if the roll extends through a cut-out in a side wall, the gap will be much wider and crop will be exposed to less circumference of the roll, which reduces the wrapping problem, too.

While under normal conditions crop will roll and jump on the top of the roll until it leaves the space between the belt runs at the side, tougher conditions may not allow such a movement. It is thus proposed to force the crop out of the space actively, for example by means of pressurized air or by an auger or any other driven conveying means.

A simple aid to move the crop outwardly is present in a sheet metal with a surface extending downwardly from an inner, center azimuth. Such a sheet metal could also strip debris from the inner surface of the belt.

In cases, in which a high volume of crop has to be recycled to the feeding device, an active conveyor can be used at the outer end area of the roll, like an auger, a paddle wheel. Such a device may move the crop axially away from the roll, the belts and the side wall and radially to the guide. It may also give some inertia to the crop, such that the crop will be positively moved through the guide and reach the feeding device.

Since the crop tends to move with the belt(s) and/or the roll, it is helpful to rotate the conveyor in the opposite direction and achieve a stripping and or catching effect thereby. The speed of rotation may be selected to achieve the best crop engagement effect at lowest drive energy consumption.

Paddles and any other crop-engaging fins, like teeth, tines, brushes etc. positively throw the crop in a direction given by the guide.

A simple, well covered and highly reliable way to drive the conveyor by means of the roll and in a reverse direction, is seen in the use of a planetary gear, which, due to the little driving force, may consist of plastic. The sun gear may be located or processed in the roll or its stub shaft, the planet gear carrier may be rotationally fixed, e.g. at the side wall, and the ring gear may form the conveyor.

Since a gap exists between the roll and the sidewalls and/or belt(s) for the crop exit, said gap may also be used to feed in net or other web material into the bale-forming chamber, whereas said material would be guided by the circumference of the roll, eventually with the belt(s) on it.

BRIEF DESCRIPTION OF THE DRAWINGS

The drawing shows a single embodiment of the invention, which is described more in detail in the following description.

DESCRIPTION OF THE PREFERRED EMBODIMENT

Figure 1:
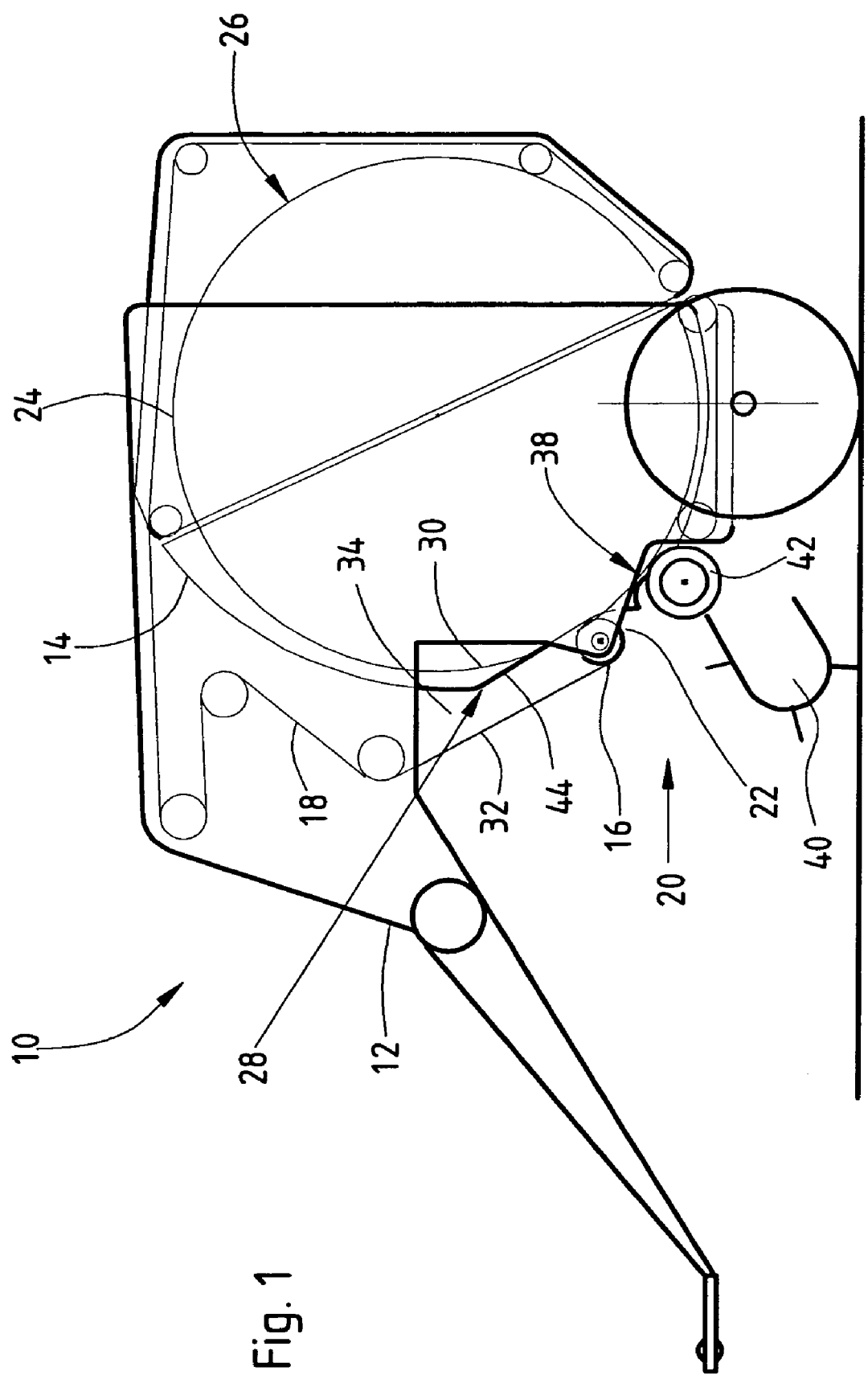
FIG. 1 is a schematic, left side view of a large round baler constructed in accordance with the principles of the present invention.

A round baler 10 shown in FIG. 1 comprises a frame 12, side walls 14, rolls 16, belts 18, a feeding device 20 and a crop passage or path 22.

While the large round baler 10 is shown as being of the variable chamber type, it could be also of the mixed chamber or fixed chamber type. Generally the round baler 10 is used to bale agricultural crop like hay, straw or grass, whereas said crop, depending on the weather and drying conditions, may break into small pieces. The round baler 10 is driven and pulled by a non-shown tractor over a field to collect crop usually lying on the ground in the form of a windrow or swath, not shown.

The frame 12 serves to carry and connect all widely known parts, like tongue, wheels, side walls 14, rolls 16, feeding device 20 and other components not shown in the drawing but known to the men skilled in the art.

The side walls 14 are formed of sheet metal fixed to a structure and define opposite sides of a bale-forming chamber 24 where face sides of a bale 26 are formed. Substantially parallel to the side walls 14, side shields may be provided, which cover the round baler 10 on its side areas to avoid contact with driven components, etc. As can be seen in FIG. 1, the side walls 14 cover the bale-forming chamber 24 substantially except in a front, lower region, where a cut-out 28 is provided. The cut-out 28 is arranged and formed such, that a lower front one of the rolls 16 and the belts 18 are not covered laterally.

Figure 2:
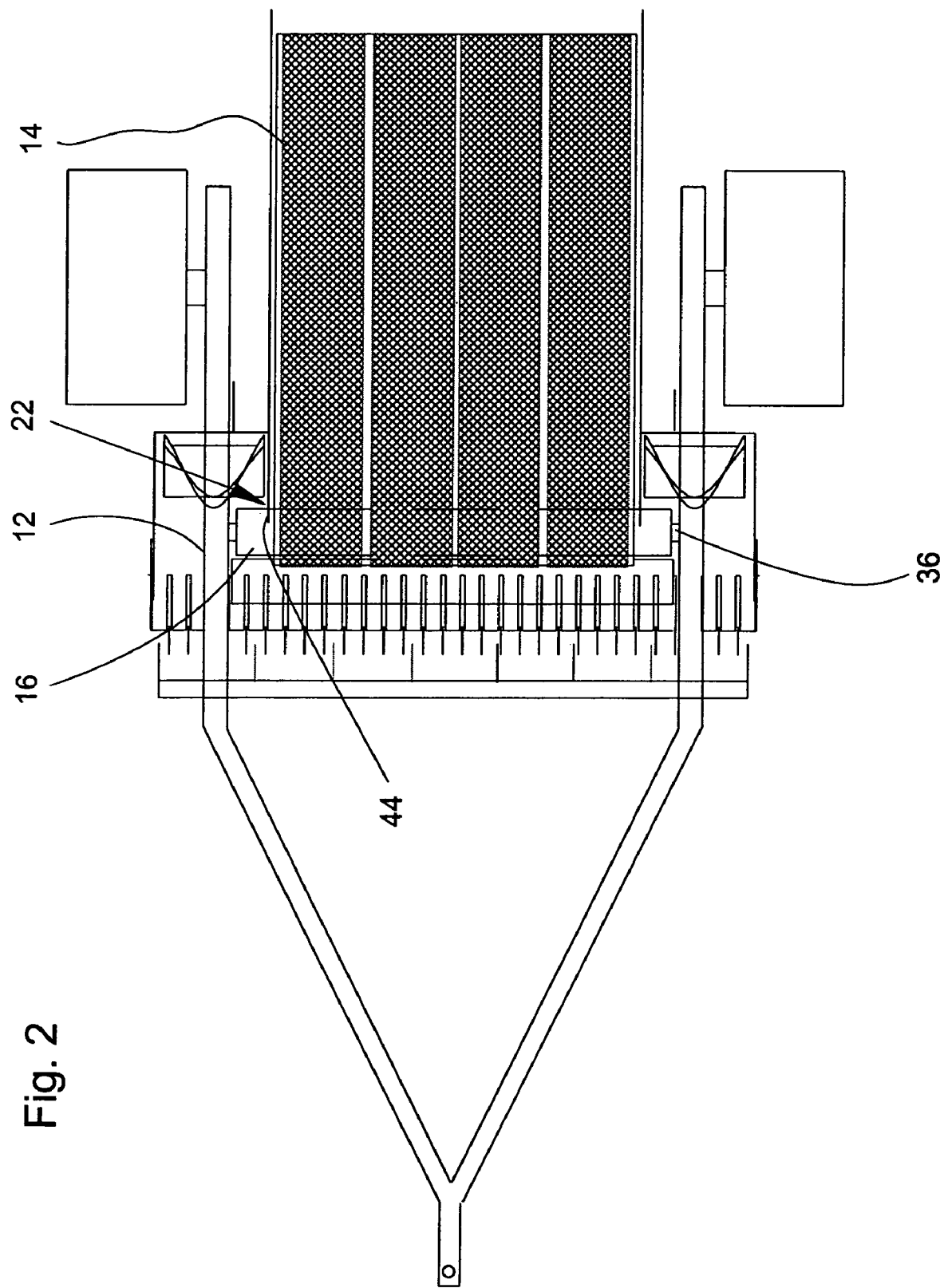
FIG. 2 is a top view of the baler shown in FIG. 1.
Figure 3:
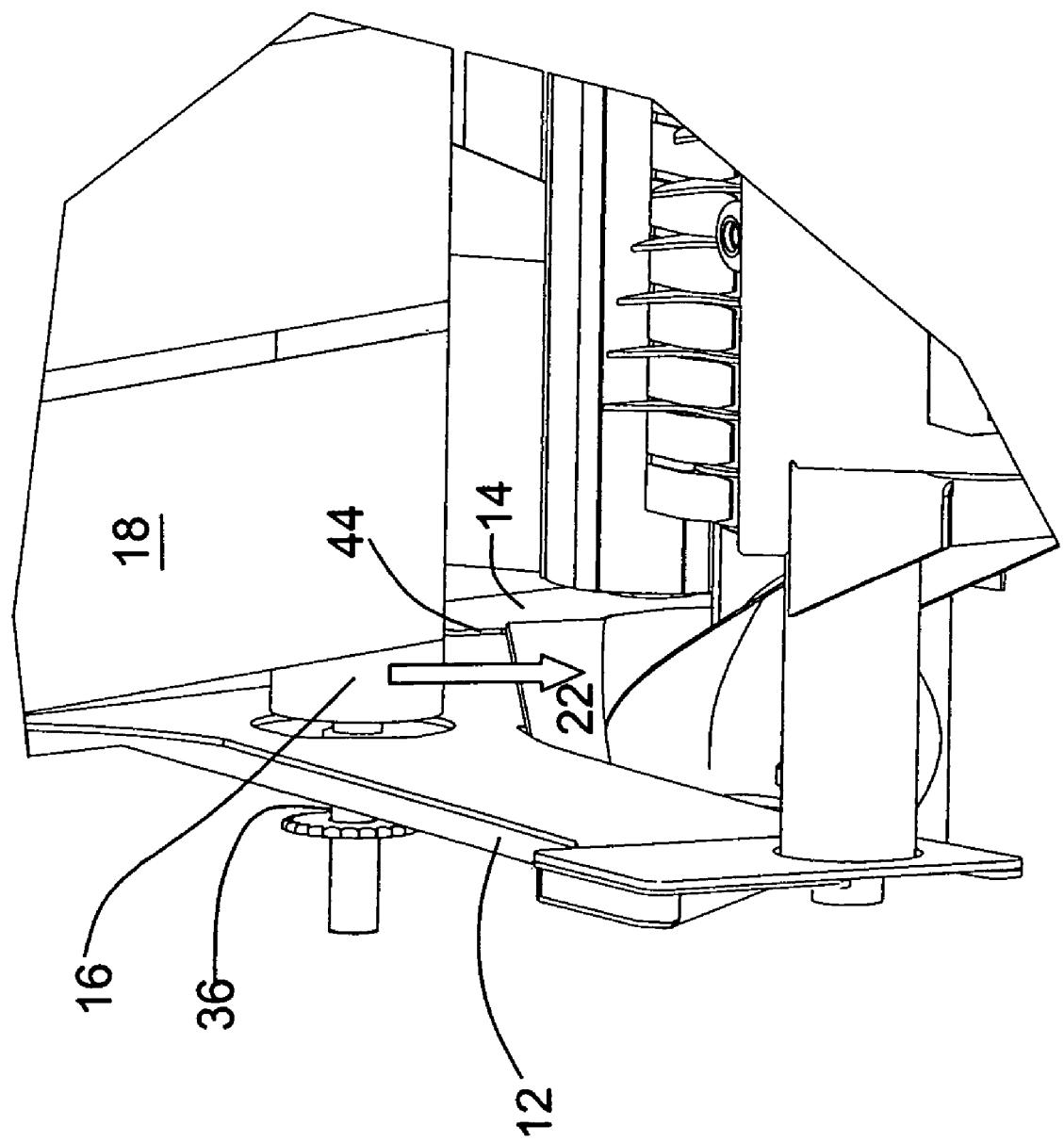
FIG. 3 is a right, front perspective view of a section of the round baler of FIG. 1 showing a roll end area and a path followed by ejected trapped crop.

The rolls 16 extend between the sidewalls 14 with their axes running parallel to each other. Some of the rolls 16 are driven and each roll 16 supports one or more belts 18. The position of at least one of the rolls 16 can be changed against the force of a tensioning device, not shown, to avoid slack in the belts 18 and to assure that the bale 26 can reach a high density, as is well known. The following description will refer only to the lower front roll 16 adjacent the cut-out 28. This roll 16 is the lowermost roll 16 in the front region of the round baler 10, although this is not necessary. An inner run 30 of the belts 18, adjacent to the bale-forming chamber 24, changes over into an outer run 32, remote from the bale-forming chamber 24. It is clear from the drawing that these two runs 30, 32 delimit a space 34 between them. Furthermore the two runs 30, 32 extend upwardly from the lower front roll 16 in a diverging manner. While the outer run 32 is always located outside the side walls 14 or even through the cut-out 28, the inner run 30 does not or hardly cross the cut-out 28, but remains between the sidewalls 14. As can be seen in FIGS. 2 and 3, the roll 16 terminates in stub shafts 36 extending beyond the side walls 14 and being journalled in the frame 12 or in a structure fixed to it. The roll 16 has a smooth circumferential surface, but could also be provided with sleeves to assure a straight belt movement and/or to avoid that crop gets squeezed between the belts 18 and the roll 16. The roll 16 in question is located above the feeding device 20, and defines a top side of a crop inlet 38 of the bale-forming chamber 24.

A series of belts 18 is trained over the rolls 16 and form a more or less closed surface. However, gaps do exist between the parallel belts 18. Instead of several belts 18 a single belt 18 extending over the full width of the bale-forming chamber 24 could be used. While this would eliminate pieces of brittle crop from entering the space 34 from the baling-forming chamber 24 by passing through belt gaps, crop leaving the bale-forming chamber 24 in the area of the side walls 14 still could enter the space 34 between the runs 30, 32.

The feeding device 20 is a device that forwards the crop lying on the ground to the bale-forming chamber 24 through the inlet 38. As such, the feeding device 20 can be of various compositions, sizes and principles. For example, it could be a mere pick-up 40, or a pick-up followed by an overshot or undershot conveyor 42, and/or followed by a cutting device, and/or by a converging auger, etc. In the preferred embodiment, a pick-up 40 followed by an overshot conveyor 42 is used, which both at least extend over the full width of the bale-forming chamber 24, as is shown in FIG. 2.

The crop passage or path 22, as is best seen in FIGS. 1 and 3, is formed at each side of the baler by a space which exists between a front edge 44 of the side wall 14 and the belt 18 in the fore-and-aft direction, between the side wall 14 and the frame 12 in the lateral direction and between the roll 16 and the feeding device 20 in the vertical direction. This passage 22 allows an unobstructed flow of crop from the space 34 to the feeding device 20. The crop, which escaped along this path, falls either on the top of an incoming crop mat or onto the pick-up 40 or the conveyor 42.

Figure 4:
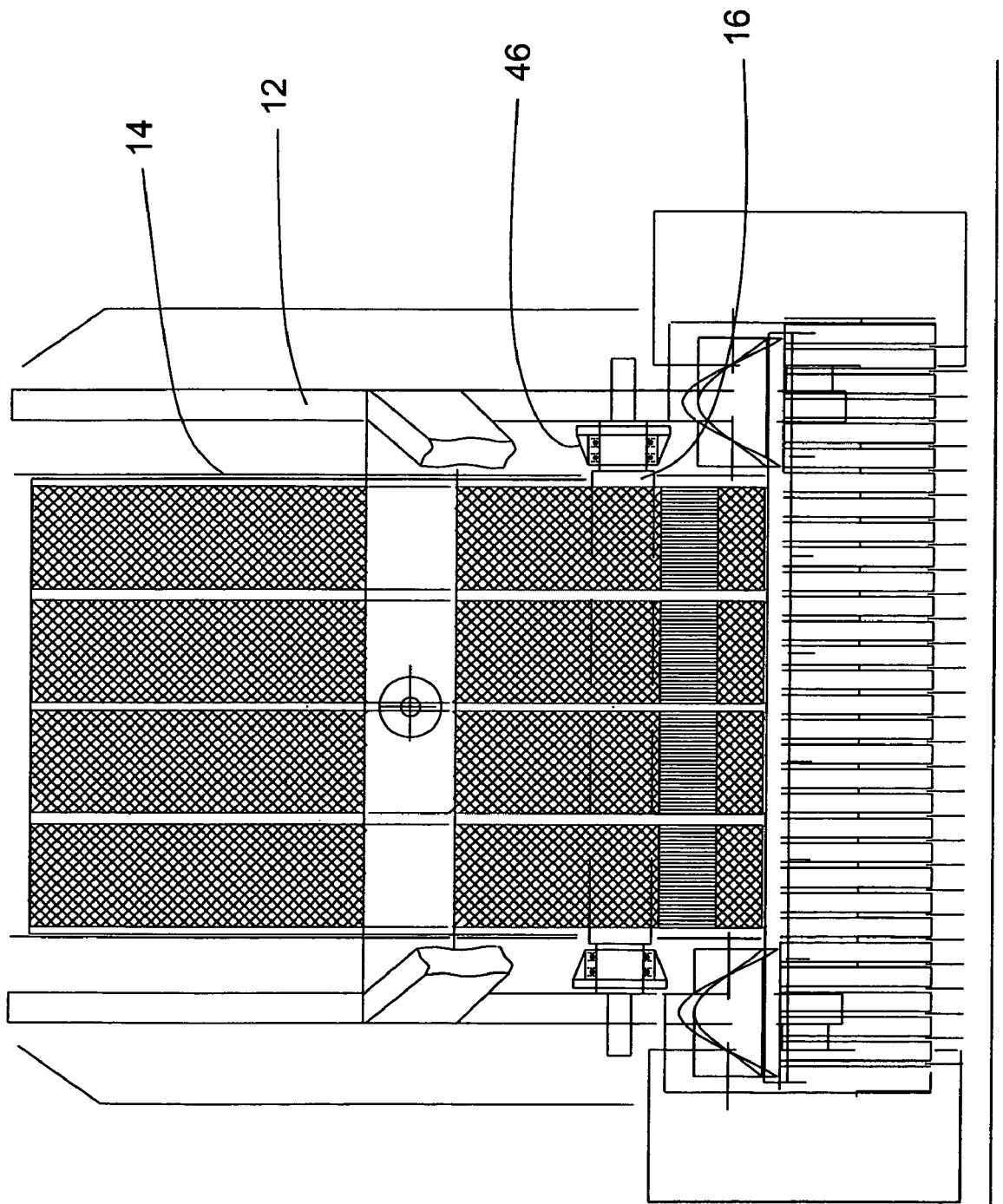
FIG. 4 is a front view of a large round baler showing a conveyor on each end of one of the bale-forming belt support rolls.

FIG. 4 shows a similar embodiment, however, both ends of the roll 16 is in addition provided with a conveyor 46 to assist the crop flow along the passage 22. While in non-shown embodiments, this conveyor 46 could be fixed to the roll 16 or even be a part of it, in the preferred embodiment, each conveyor 46 is separate from the roll and is driven as explained with reference to FIG. 5.

Figure 5:
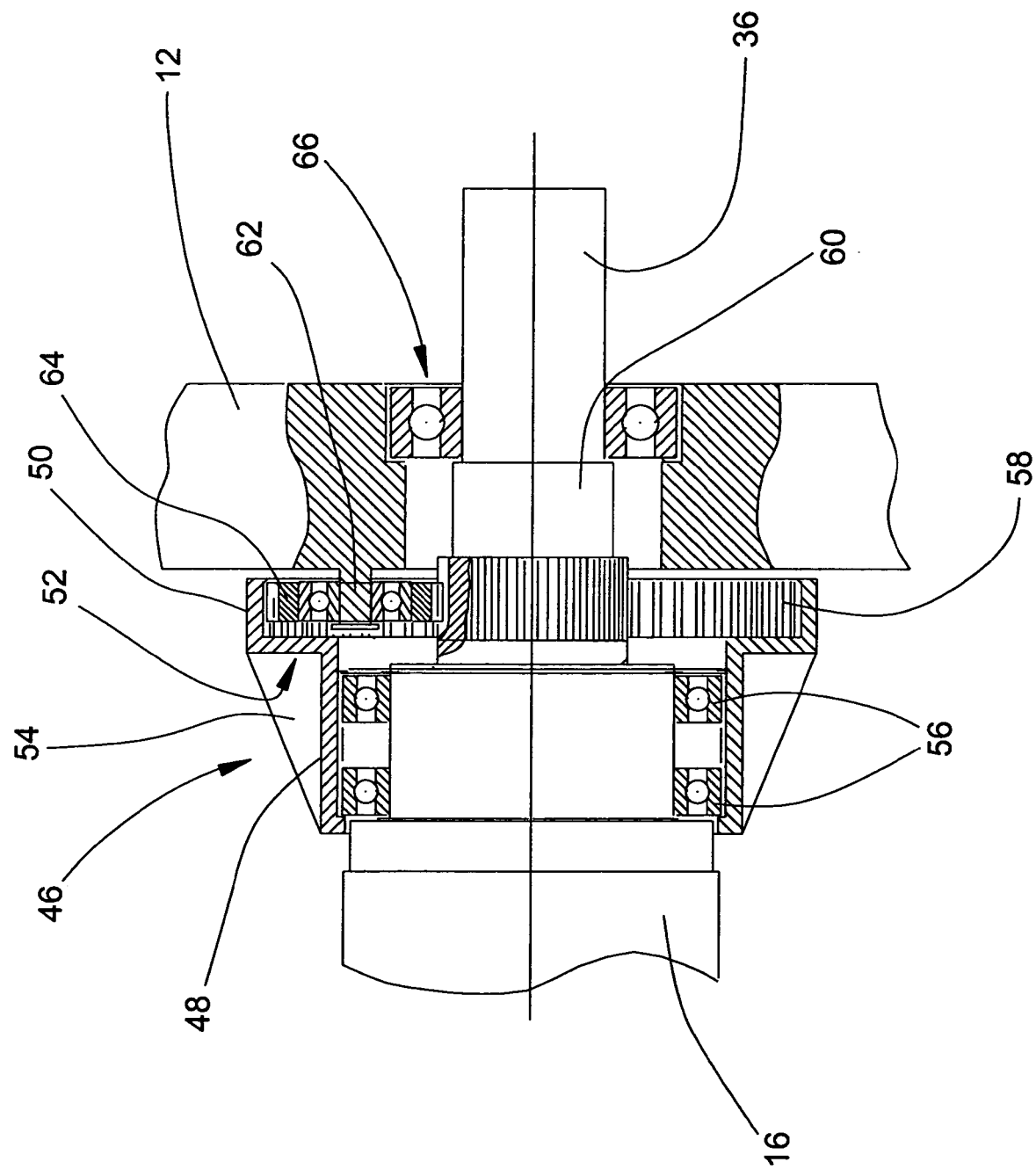
FIG. 5 is a sectional view taken through one end of the support roll of FIG. 4 showing a drive system for the conveyor.

According to FIG. 5, the conveyor 46 is formed with an inner hub 48 and an outer hub 50, with the outer hub 50 being bigger in diameter than the inner one. The hubs 48, 50 are formed integrally with each other, extend concentrically to each other and form a shoulder 52. A plurality of triangular crop-engaging fins 54 are spaced angularly about, and formed along, the inner hub 48, beginning at an inner end of the hub 48 and terminating at a radial outer edge of the outer hub 50. Such crop-engaging fins 54 can be formed integrally with the hubs 48 and 50, as shown, or they can be releasably fixed. The shape of the fins 54 may be straight, as shown, or they may be bent, like a spiral etc. Further, the fins 54 may be made of metal or plastic. The particular version of the fins 54 used depends on the crop and the circumstances under which it is processed.

The inner hub 48 is journalled on the outside of the roll 16 by a set of bearings 56 and can rotate freely with respect to the roll 16. The interior of the outer hub 50 is formed as, or contains, a ring gear 58. The stub shaft 36 is formed as a gear 60 or has a gear wheel installed on it, the diameter of which is much smaller than the inner diameter of the ring gear 58. In an outer end region, the stub shaft 36 is journalled in the frame 12 by means of a bearing 66.

Attached to the inner side of the frame 12 in the area, where the conveyor 46 will be located, when installed, is one or more studs 62. These studs 62 may be fixed or screwed in, and each stud 62 carries a gear wheel 64, which is dimensioned such, that it may mesh with the ring gear 58 as well as with the gear 60. The ring gear 58, the gear 60 and the gear wheels 64 form a planetary drive, in which the gear 60 is the sun wheel and the gear wheels 64 are the planets.

From the foregoing, it is obvious, that when the planetary gear is installed, the conveyor 46 is journalled on the roll 16 and the stub shaft 36 is journalled in the frame 12, the conveyor 46 is driven in a direction opposite to the direction of the roll 16, such catching and forcing the crop along the passage 22.

Having described the preferred embodiment, it will become apparent that various modifications can be made without departing from the scope of the invention as defined in the accompanying claims.

The invention claimed is:

1. In a large round baler having a main frame supported on wheels for permitting the baler to be towed over the ground, a crop feeding device mounted to the frame and arranged for picking up crop material from the ground and delivering the crop material through an inlet of a bale-forming chamber carried by the frame and said bale-forming chamber being delimited, in substantial part, by a pair of side walls spaced transversely to a direction of travel of said baler, and an endless bale-forming element arrangement supported, at least in part, by a bale-forming element support roll extending between and having opposite end regions at locations disposed directly above said crop feeding device, the improvement comprising: said support roll extending beyond at least said pair of side walls and, a crop passage formed at each side of the baler by a space existing between a front edge of each of the side walls and the bale-forming element in a fore-and-aft direction, between the side wall and the frame in a lateral direction and between the roll and the feeding device in a vertical direction wherein the passage allows an unobstructed flow of crop from the space to the feeding device and wherein the crop escaping along this path, falls either on the top of an incoming crop mat or onto the crop feeding device.

2. The large round baler, as defined in claim 1, wherein said passage is open at a lower end.

3. The large round baler according to claim 1, wherein said bale-forming element arrangement engages said support roll so as to define upwardly diverging inner and outer runs having a space between them into which stray crop may enter; and opposite ends of said space being located at said areas adjacent said open end regions of said support roll.

4. The large round baler, as defined in claim 3, wherein said bale-forming arrangement includes a plurality of belts arranged side-by-side across said support roll and having narrow gaps between adjacent belts through which pieces of crop may pass from said bale-forming chamber into said space.

5. The large round baler, as defined in claim 1, wherein a cut-out is provided in said at least one of said pair of side walls; and said support roll projecting through said cut-out; and said crop passage including a space between said cut-out and said support roll.

6. The large round baler, as defined in claim 1, wherein said support roll has opposite ends defined by stub shafts which project through said pair of side walls.

7. The large round baler, as defined in claim 1, wherein a driven conveyor is provided at said opposite end regions of said support roll.

8. The large round baler, as defined in claim 7, wherein said support roll is driven in a first direction; and said conveyor is driven in a second direction opposite to said first direction.

9. The large round baler, as defined in claim 7, wherein said conveyor has crop-engaging fins.

10. The large round baler, as defined in claim 7, wherein said conveyor is driven from said support roll by a planetary drive.

* * * * *